(No Model.)

G. COOPER.
KNOB.

No. 283,380. Patented Aug. 21, 1883.

Witnesses
James R Bowen.
J. T. Keane

Inventor
George Cooper
by his attorney
Edwin H. Brown

UNITED STATES PATENT OFFICE.

GEORGE COOPER, OF GREENWOOD IRON WORKS, NEW YORK.

KNOB.

SPECIFICATION forming part of Letters Patent No. 283,380, dated August 21, 1883.

Application filed December 27, 1882. (No model.)

*To all whom it may concern:*

Be it known that I, GEORGE COOPER, of Greenwood Iron Works, in the county of Orange and State of New York, have invented a certain new and useful Improvement in Means for Securing Knobs, for Doors and Like Articles, to their Shanks, of which the following is a specification.

This improvement consists in the combination, with a door-knob or like article and a rigid shank, of bolts made entirely separate from the shank and arranged in recesses or cavities extending transversely to the shank, and means, preferably consisting of a screw, for expanding the bolts into the knob after the latter has been fitted to the shank.

Figure 1:
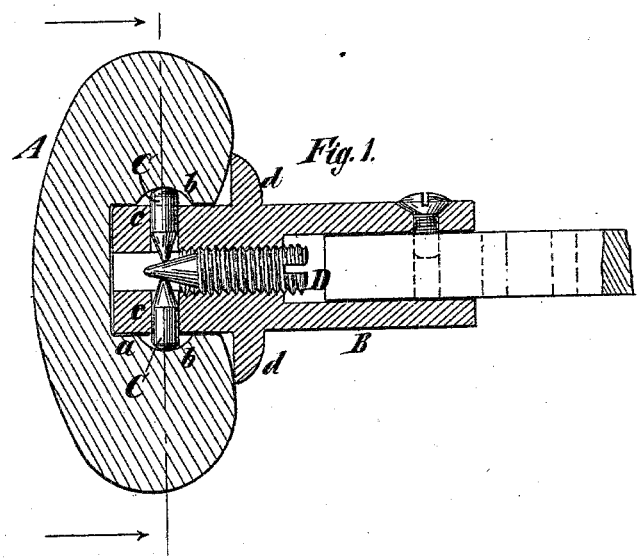
Figure 2:
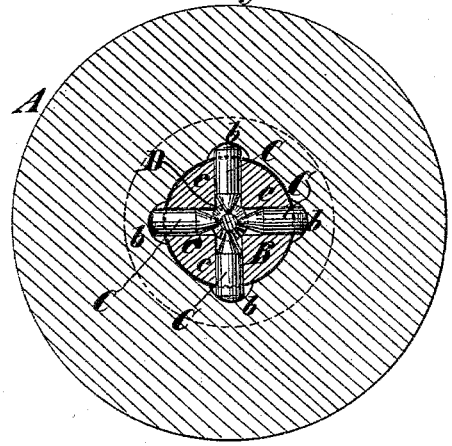

In the accompanying drawings, Figure 1 is a central longitudinal section of a door-knob and shank embodying my improvement, and Fig. 2 is a transverse section of the same.

Similar letters of reference designate corresponding parts in both figures.

A designates a door-knob made of porcelain or other earthenware.

B designates the shank for this knob. It may be made of metal, as usual, and is provided with a square or polygonal socket for the reception of the knob-spindle, which extends through the door. The shank is composed of a rigid piece from end to end.

The knob A is provided with a recess or cavity, $a$, and one end of the shank B fits therein. There may be depressions $b$ in the walls of the recess or cavity $a$. A flange, $d$, on the shank prevents it from extending too far into the knob and covers the mouth of the recess or cavity $a$. The end of the shank which fits in the recess or cavity $a$ is provided with a number of bolts, C, which fit in recesses $c$, extending transversely to the shank. These bolts are composed of pieces made entirely separate from the rigid shank. These bolts extend through to the interior of the shank.

D designates a screw engaging with a screw-thread in the interior of the shank, and having a pointed or wedge-shaped edge, which bears against the inner ends of the bolts. By turning this screw in one direction it may be withdrawn sufficiently to allow the bolts to be forced inwardly, so that they will not project beyond the exterior of the shank. Then the shank can be inserted in the knob. Afterward the screw may be turned in the other direction to force out the bolts. The bolts or dogs may engage with the depressions in the walls of the recess or cavity $a$; or, if these depressions are dispensed with, the bolts can engage with the wall of the recess or cavity.

The screw may be operated by means of a screw-driver inserted in the socket which receives the knob-spindle that extends through the door.

Other devices than a screw may be employed to operate the bolts, if desirable.

Of course the improvement can be used for other articles than door-knobs.

What I claim as my invention, and desire to secure by Letters Patent, is—

The combination, with a door-knob or like article and a rigid shank, of bolts made entirely separate from the shank and arranged in recesses or cavities extending transversely to the shank, and means for expanding the bolts into the knob after the latter has been fitted to the shank, substantially as specified.

GEORGE COOPER.

Witnesses:
JAMES R. BOWEN,
ALFRED L. BROWN.